United States Patent [19]

Matsuura et al.

[11] 4,218,376
[45] Aug. 19, 1980

[54] PROCESS FOR PRODUCING HIGHLY CHLORINATED COPPER PHTHALOCYANINE

[75] Inventors: Ryo Matsuura, Yamato; Tomio Segawa; Yukio Nomiyama, both of Yokohama; Yoichi Kumada, Zushi; Hideo Sawada, Yokohama, all of Japan

[73] Assignee: Kawasaki Kasei Chemicals Limited, Tokyo, Japan

[21] Appl. No.: 962,711

[22] Filed: Nov. 21, 1978

[30] Foreign Application Priority Data

Dec. 12, 1977 [JP] Japan .................................. 52-148081

[51] Int. Cl.$^2$ .............................................. C09B 47/10
[52] U.S. Cl. .............................. 260/314.5; 423/512 R; 423/568
[58] Field of Search ....................................... 260/314.5

[56] References Cited

U.S. PATENT DOCUMENTS 2,662,085  12/1953  Holtzman et al. ................ 260/314.5

FOREIGN PATENT DOCUMENTS 37-15790  10/1962  Japan ...................................... 260/314.5

OTHER PUBLICATIONS

Moser et al., Phthalocyanine Compounds, frontispage and pp. 176–179, Reinhold Publ. Corp., NY (1963).

*Primary Examiner*—John D. Randolph
*Attorney, Agent, or Firm*—Oblon, Fisher, Spivak, McClelland & Maier

[57] ABSTRACT

Highly chlorinated copper phthalocyanine is produced by charging chlorine under an elevated pressure of 1 to 20 Kg/cm$^2$ (gauge) into a solution of a copper phthalocyanine in the presence of pyrosulfuryl chloride and a catalyst of sulfur or sulfur chloride.

Pyrosulfuryl chloride can be formed by a reaction of chlorosulfonic acid with chlorine and sulfur or sulfur chloride under an elevated pressure.

An auxiliary catalyst of iodine, iodine chloride or a metal chloride can be incorporated to improve the chlorination.

8 Claims, No Drawings

PROCESS FOR PRODUCING HIGHLY CHLORINATED COPPER PHTHALOCYANINE

BACKGROUND OF THE INVENTION

1. Field of the Invention

The present invention relates to a process for producing a highly chlorinated copper phthalocyanine by a chlorination of a copper phthalocyanine, particularly, it relates to an industrial advantageous process for producing a highly chlorinated copper phthalocyanine by a chlorination of a copper phthalocyanine in a solvent of a sulfur oxyacid chloride such as pyrosulfuryl chloride which can be formed by a reaction of chlorosulfonic acid with chlorine and sulfur or sulfur chloride.

2. Description of Prior Arts

A copper phthalocyanine is a blue pigment. A greenish blue pigment is obtained by chlorinating a copper phthalocyanine to substitute 12 or more of hydrogen atoms of benzene rings with chlorine atoms preferably to substitute with 13 or more of chlorine atoms among 16 of sites. A brilliant yellowish green pigment is obtained by substituting with 14 or more of chlorine atoms.

The highly chlorinated copper phthalocyanine pigment is called as copper phthalocyanine green or phthalocyanine green and it is a pigment having excellent light fastness and solvent resistance.

In the well-known industrial process for producing a highly chlorinated copper phthalocyanine by a chlorination of a copper phthalocyanine, a copper phthalocyanine is dissolved in a molten mixture of anhydrous aluminum chloride and sodium chloride and it is contacted with chlorine gas at 150° to 200° C. to chlorinate the copper phthalocyanine and the reaction mixture is poured into a large amount of ice water and the chlorinated copper phthalocyanine is separated.

This process is widely carried out as an industrial process since a brilliant yellowish green pigment can be easily obtained.

However, the following disadvantages are found.

(1) A cost for a recovery of aluminum chloride and sodium chloride is too high to carry out as an industrial purpose and a cost for treating aluminum chloride in a waste water is remarkably high because 5 to 8 times by weight of anhydrous aluminum chloride to a copper phthalocyanine is used and the reaction mixture is poured in water.

(2) A chlorination is carried out at high temperature of 150° to 200° C. whereby various by-products are formed to decrease a yield.

On the other hand, it has been known to produce a highly chlorinated copper phthalocyanine by dissolving a copper phthalocyanine in chlorosulfonic acid and charging chlorine into the solution in the presence of a catalyst in U.S. Pat. No. 2,662,082.

This process has advantages.

(1) A reaction temperature is upto 115° C. and an operation is easier and a corrosion of an apparatus is lower in comparison with those of the aluminum chloride-sodium chloride process.

(2) A cost of chlorosulfonic acid is lower than that of anhydrous aluminum chloride.

However, this process has not been carried out as an industrial process because of the following reason.

(1) A yield is remarkably lower than that of the aluminum chloride-sodium chloride process.

(2) A hue of the resulting pigment is not good and bluish and a brilliant yellowish green has not been given.

It has been also known to produce a highly chlorinated copper phthalocyanine by chlorinating a copper phthalocyanine in a solvent of pyrosulfuryl chloride with thionyl chloride in Japanese Patent Publication No. 15790/1962.

This process is not an industrial process because a large amount of thionyl chloride is used.

Heretofore, it has been considered that when chlorine gas is charged in a solution of a copper phthalocianine in a strong acidic solvent such as sulfuric acid and fuming sulfuric acid, an oxidation of a copper phthalocyanine is caused to reduce a yield (Phthalocyanine compound, Moser, Thomas Page 178. Japanese Patent Publication No. 15790/1962).

In accordance with the process of U.S. Pat. No. 2,662,082, the chlorination of a copper phthalocyanine is carried out in chlorosulfonic acid under the atmospheric pressure with a small amount of a chlorination catalyst of sulfur chloride, only bluish green chlorinated copper phthalocyanine is obtained in a yield of about 50%.

The inventors have studied to improve the process using a solvent of chlorosulfonic acid and have found that a brilliant yellowish green highly chlorinated copper phthalocyanine can be obtained in high yield by charging chlorine under an elevated pressure in the presence of pyrosulfuryl chloride and excess of a catalyst of sulfur or sulfur chloride. This invention has been attained by this finding.

SUMMARY OF THE INVENTION

It is an object of the present invention to overcome the disadvantages of the conventional chlorination of a copper phthalocyanine in a sulfur oxyacid chloride such as chlorosulfonic acid.

It is an object of the present invention to provide a process for producing a highly chlorinated copper phthalocyanine having brilliant yellowish green in high yield and industrial advantages in a chlorination of a copper phthalocyanine in a solvent of a sulfur oxyacid chloride in economical manner.

The foregoing and other objects of the present invention have been attained by providing a process for producing a highly chlorinated copper phthalocyanine by charging chlorine under an elevated pressure of 1 to 20 Kg/cm$^2$ (gauge) preferably 2 to 8 especially 3 to 7 Kg/cm$^2$ (gauge) into a solution of a copper phthalocyanine in the presence of pyrosulfuryl chloride and a catalyst of sulfur or sulfur chloride at a ratio to remain more than 1 wt.% as sulfur component based on pyrosulfuryl chloride when converting chlorosulfonic acid into pyrosulfuryl chloride by reacting with chlorine.

DETAILED DESCRIPTION OF THE PREFERRED EMBODIMENTS

Pyrosulfuryl chloride can be formed by reacting chlorosulfonic acid with chlorine and sulfur or sulfur chloride under an elevated pressure. Accordingly, the process of the present invention can be carried out under forming pyrosulfuryl chloride by reacting chlorosulfonic acid with chlorine and sulfur or sulfur chloride, if necessary, with an auxiliary catalyst of iodine, iodine chloride or a metal chloride.

The catalyst of sulfur and sulfur chloride should be remained under converting chlorosulfonic acid into pyrosulfuryl chloride. Accordingly, a ratio of the catalyst of sulfur or sulfur chloride to chlorosulfonic acid is in a range of 7 to 200 wt.% preferably 8 to 100 Wt.% as sulfur.

The reaction of chlorosulfonic acid with chlorine and sulfur or sulfur chloride is considered as follows.

$$8SO_2(OH)Cl + 2S + 6Cl_2 \rightarrow 4S_2O_5Cl_2 + 2SO_2Cl_2 + 8HCl$$

$$8SO_2(OH)Cl + S_2Cl_2 + 5Cl_2 \rightarrow 4S_2O_5Cl_2 + 2SO_2Cl_2 + 8HCl$$

$$I_2 + Cl_2 \rightarrow 2ICl \text{ or } ICl_3$$

$$S_2Cl_2 + Cl_2 \rightarrow 2SCl_2$$

Chlorosulfonic acid can be substituted with thionyl chloride to form pyrosulfuryl chloride.

Pyrosulfuryl chloride can be formed by reacting thionyl chloride with sulfur trioxide.

When the resulting solvent is recovered by a distillation etc. after the chlorination from the reaction mixture, a mixture of pyrosulfuryl chloride and sulfuryl chloride or thionyl chloride can be obtained and it can be reused as the solvent.

An amount of the solvent is preferably in a range for dissolving or suspending a copper phthalocyanine and contacting chlorine thoroughly with the copper phthalocyanine. It is preferable to use an amount of the solvent to be capable of stirring thoroughly the reaction mixture by a conventional stirrer used in the industrial processes and it is about 3 to 50 times by weight to the copper phthalocyanine, especially 4 to 8 times by weight in an industrial purposed.

It is important to perform the chlorination in the presence of the catalyst of sulfur or sulfur chloride such as sulfur monochloride and sulfur dichloride with or without an auxiliary chlorination catalyst of iodine, iodine chloride or a metal chloride such as aluminum chloride and antimony chloride.

When only the catalyst of sulfur or sulfur chloride is used, a yield of the resulting highly chlorinated copper phthalocyanine is high and a color is brilliant, but a bluish green pigment is obtained. In order to obtain a yellowish green pigment, it is necessary to elevate the reaction temperature. Accordingly, it is preferable to incorporate both of the catalyst and the auxiliary catalyst such as iodine.

It is usual to incorporate the auxiliary catalyst at a ratio of 0.001 to 10 wt.% to the solvent whereby a brilliant yellowish green pigment can be obtained in high yield.

Suitable auxililary catalyst used with the catalyst include iodine and iodine chlorides such as iodine monochloride and iodine trichloride, and metal chlorides such as anhydrous aluminum chloride, anhydrous ferric chloride, antimony trichloride and c pric chloride.

The catalyst can be sulfur or sulfur chloride or a mixture thereof.

An amount of the catalyst of sulfur or sulfur chloride is more than 7 wt.% as sulfur component to chlorosulfonic acid (which corresponds to more than 1 wt.% to pyrosulfuryl chloride). When a content of the catalyst is less than 7%, a yield of the highly chlorinated copper phthalocyanine is remarkably low. An amount of the catalyst of sulfur or sulfur chloride is in a range of 7 to 200 wt.% preferably 8 to 100 wt.% in an industrial operation.

When it is more than 200 wt.%, the chlorination is not smoothly performed and a number of substituted chlorine atoms in one molecule is lower than 13 as average and a desired pigment can not be obtained.

When the chlorination is performed in chlorosulfonic acid with the catalyst of sulfur or sulfur chloride, the chlorination of a copper phthalocyanine is performed as well as the chlorination of chlorosulfonic acid with chlorine and the catalyst of sulfur or sulfur chloride is mainly performed to form a mixture which mainly contains pyrosulfuryl chloride and then, the chloration of the copper phthalocyanine is performed.

Thus, when pyrosulfuryl chloride is separately produced to use it as the solvent, the amount of the catalyst of sulfur or sulfur chloride as sulfur component can be reduced to 1 wt.% or more than 1 wt.%. Thus, when chlorosulfonic acid is used as the solvent, the amount of the catalyst of sulfur or sulfur chloride is 7 wt.% or more than 7 wt.% preferably 8 wt.% or more than 8 wt.%.

In the process of the present invention, the elevated pressure is important factor for producing a brilliant yellowish green pigment in high yield.

The pressure is usually in a range of 1 to 20 Kg/cm² (gauge) preferably 2 to 8 Kg/cm² (gauge) especially 3 to 7 Kg/cm² (gauge).

In the case of 1 to 2 Kg/cm² (gauge), a brilliant pigment of the crude highly chlorinated copper phythalocyanine can be obtained in a yield of more than 96% (as theoretical value) but the color is bluish green.

In the case of higher than 2 Kg/cm² (gauge) especially higher than 3 Kg/cm² (gauge), a brilliant yellowish green pigment of the crude highly chlorinated copper phthalocyanine can be obtained in high yield.

Chlorine can be charged in a form of liquid or gas and preferably in a form of gas.

It is not advantageous as an industrial operation, to perform the chlorination under a pressure of higher than 20 Kg/cm² (gauge). In general, it is preferable to be lower than 10 Kg/cm² (gauge) especially lower than 8 Kg/cm² (gauge) whereby a liquefaction of chlorine gas is not caused at room temperature. It is optimum to be lower than 7 Kg/cm² (gauge).

In general, a reaction time can be shortened and an amount of chlorine can be reduced and a loss of the solvent in the reaction can be reduced advantageously depending upon elevating the reaction pressure.

In the process of the present invention, the reaction temperature is usually lower at the initial stage such as to elevate from room temperature to 100° C. to 120° C. during the reaction.

It is advantageous to elevate the pressure to higher level at the maximum reaction temperature. When the reaction temperature is higher than 120° C., a color of the pigment is a brilliant yellowish green however, a yield is remarkably low. In general, the maximum temperature is 90° C. to 115° C.

In the chlorination of the present invention, the solvent of sulfur oxyacid chloride especially pyrosulfuryl chloride with chlorosulfonic acid, the catalyst of sulfur or sulfur chloride and the auxiliary catalyst of iodine and the copper phthalocyanine at suitable ratios are mixed and chlorine is contacted with the mixture under an elevated pressure and it is heated from room temperature to 100° C. to 115° C. In general, the chlorination is completed to maintain the temperature for about 1 to 1.5 hours.

In the post-treatment, it is possible to employ the known process wherein the reaction mixture is poured into a large amount of ice water and the crystallized product is washed with an acid and filtered and then, it is washed with a diluted alkaline solution and filtered, and it is washed with water and dried. Thus, a brilliant yellowish green crude highly chlorinated copper phthalocyanine can be obtained in high yield.

Phthalocyanine green having high quality can be obtained from the crude product by the conventional pigmentation.

In the process of the present invention, most or part of the solvent can be recovered from the reaction mixture obtained by the chlorination by a distillation especially a distillation under the atmospheric pressure or a reduced pressure. When the recovered solvent is used, unexpected superior effect is attained.

The solvent recovered by the distillation includes pyrosulfuryl chloride and other sulfur oxyacid chlorides such as sulfuryl chloride and the catalyst of sulfur chloride and the auxiliary catalyst of iodine chloride etc. Accordingly, it is possible to add the copper phthalocyanine to the recovered solvent at suitable ratio so as to use the mixture for the chlorination.

It is possible to use the recovered solvent as the solvent and the catalyst after adding a fresh solvent and a fresh catalyst at ratios corresponding to the amount of the solvent and catalyst lost during the reaction and the recovery.

The bottom residue contaning highly chlorinated copper phthalocyanine remained in the recovery of the solvent is discharged with water or a diluted sulfuric acid and it is washed with an acid and filtered and it is washed with a diluted alkaline solution and filtered and it is washed with water and dried.

The particles of the resulting crude highly chlorinated copper phthalocyanine are relatively uniform and large which are contrary to the fact that the particles of the same product obtained by the conventional post-treatment for pouring directly the reaction mixture into water (direct water-pouring method) are nonuniform and fine.

When the crude highly chlorinated copper phthalocyanine is pigmentized by an acid pasting method, an acid slurry method or a salt grinding method, the pigment obtained by the pigmentation of the crude product obtained by the solvent recovery method has significantly superior brilliant color in comparison with that of the direct water-pouring method.

When the process of the present invention is carried out by using the recovery solvent, the losses of the sulfur oxyacid chloride such as pyrosulfuryl chloride and chlorosulfonic acid, the catalyst such as sulfur or sulfur chloride and/or the auxiliary catalyst such as iodine can be remarkably reduced and the loss of chlorine can be reduced and a quality of the resulting pigment is significantly superior and the significant industrial advantages can be attained.

The present invention is illustrated but not limited by the following examples.

EXAMPLE 1

In a reactor 380 wt. parts of chlorosulfonic acid, 59 wt. parts of sulfur (16% based on chlorosulfonic acid) and 3.7 wt. parts of iodine were charged and 75 wt. parts of a crude copper phthalocyanine (purity 92%) was charged to dissolve with stirring. Chlorine gas was charged into the resulting solution under elevating gradually a temperature from room temperature to 100° C. The pressure in the reactor was elevated to 3 $Kg/cm^2$ (gauge) during about 20 minutes. In order to maintain the pressure, an opening degree of a control valve disposed at an outlet of the reactor was controlled depending upon a flow rate of chlorine gas. Chlorine gas was charged for 5 hours to change a color of the solution from greenish black to deep red. Total amount of chlorine gas charged was 360 wt. parts.

The reaction mixture was cooled at lower than 50° C. and poured into 3 liter of ice water. The mixture was stirred and heated to 90° C. and stirred for 1 hour and filtered. The resulting cake was charged into 3000 wt. parts of 2% diluted sodium hydroxide aqueous solution. The mixture was stirred at 90° C. for 1 hour and it was filtered and washed with water and dried to obtaine 132 wt. parts of a brilliant yellowish green crude chlorinated copper phthalocyanine. The product had 14.5 of substituted chlorine atoms, as an average, in the phthalocyanine molecule and had a purity of 96% and a yield was 98% (as tneoretical value).

When the other auxiliary chlorinated catalyst of anitimony trichloride was used instead of iodine, the same result was obtained.

REFERENCE 1

In accordance with the process of Example 1 except changing the pressure of the reactor to the atmospheric pressure (0 $Kg/cm^2$ (gauge), the chlorination was carried out to obtain 104 wt. parts of dark bluish green crude chlorinated copper phthalocyanine was obtained. The product had 13 as average, of substituted chlorine atoms in the phthalocyanine molecule and a purity of 93% and a yield was 79% (as theoretical value).

As it is clear from the reference, the brilliant yellowish green highly chlorinated copper phthalocyanine was obtained in high yield by the process of the present invention.

REFERENCE 2

In accordance with the process of Example 1 except changing the amount of sulfur to 22.0 wt. parts (5.8% based on chlorosulfonic acid), the chlorination was carried out to obtain 75.4 wt. parts of a yellowish green crude chlorinated copper phthalocyanine. The product had 15 as average, of substituted chlorine atoms in the phthalocyanine molecule and a purity of 96% but a yield was 55% (as theoretical value).

EXAMPLE 2

In a reactor, 380 wt. parts of chlorosulfonic acid, 23 wt. parts of sulfur (6.1% based on chlorosulfonic acid) and 3.7 wt. parts of iodine were charged and chlorine gas was charged under an elevated pressure of 3 $Kg/cm^2$ (gauge) at a temperature from room temperature to 40° C.

When unreacted chlorine was discharged, the charge of chlorine gas was stopped to obtain a crude pyrosulfuryl chloride.

In the crude pyrosulfuryl chloride, 75 wt. parts of a crude copper phthalocyanine (purity 92%) and 15 parts of sulfur were added and in accordance with the process of Example 1, chlorine was charged under a pressure of 3 $Kg/cm^2$ (gauge) and treated to obtain 131 wt. parts of a crude highly chlorinated copper phthalocyanine. The product had 14.6 as average, of substituted chlorine atoms in the phthalocyanine molecule and a purity of 97% and a yield was 98% (as theoretical value).

EXAMPLE 3

In accordance with the process of Example 1 except eliminating the charge of iodine, the chlorination was carried out to obtain 131 parts of a slightly bluish green crude chlorinated copper phthalocyanine. The product had 14 as average, of substituted chlorine atoms in the phthalocyanine molecule and a purity of 96% and a yield was 100% (as theoretical value).

EXAMPLE 4

In accordance with the process of Example 1 except changing the amount of chlorosulfonic acid to 255 wt. parts and changing sulfur to 250 wt. parts of sulfur monochloride (46% as S based on chlorosulfonic acid), the chlorination was carried out to obtain 135 wt. parts of a brilliant yellowish green crude chlorinated copper phthalocyanine. The product had 15.3, as average, of substituted chlorine atoms in the phthalocyanine molecule and a purity of 97% and a yield of 99% (as theoretical value).

In accordance with the same process except changing the amount of sulfur monochloride as S based on chlorosulfonic acid to 6, 10, 100, 114, 200, 250 or 400 wt.%, the chlorination was carried out to obtain results shown in Table 1.

Table 1

| | Effect of sulfur monochloride in solvent | | |
|---|---|---|---|
| | Ratio of sulfur monochloride as S to chlorosulfonic acid (%) | Number of chlorine atoms in phthalocyanine molecule | Yield (%) |
| Reference | 6 | 15.0 | 55 |
| Example | 10 | 14.6 | 98 |
| Reference Example | 46 | 15.3 | 99 |
| Reference Example | 100 | 14.4 | 98 |
| Reference Example | 114 | 14.0 | 98 |
| Reference Example | 200 | 13.0 | 98 |
| Reference | 250 | 12.5 | 99 |
| " | 400 | 11.4 | 97 |

EXAMPLE 5

In accordance with the process of Example 1 except changing the pressure of the reactor to 1.0 Kg/cm$^2$ (gauge), the chlorination was carried out to obtain 124 wt. parts a bluish green crude chlorinated copper phthalocyanine. The product had 13.5 as average, of substituted chlorine atoms in the phthalocyanine molecule and had a purity of 96% and a yield was 96% (as theoretical value).

EXAMPLE 6

In accordance with the process of Example 1, the chlorination was carried out under the same condition and then, the reaction mixture was heated under a reduced pressure to distil 310 wt. parts of a solvent.

The bottom residue after the distillation was mixed with 3000 wt. parts of 2% $H_2SO_4$ and the mixture was stirred at 90° C. for 1 hour and it was filtered and the cake was charged into 3000 wt. parts of 2% NaOH and the mixture was stirred at 90° C. for 1 hour and it was filtered and dried to obtain 133 wt. parts of a brilliant yellowish green crude chlorinated copper phthalocyanine. The product had 14.8 as average, of substituted chlorine atoms in the phthalocyanine molecule and had a purity of 96% and a yield was 98% (as theoretical value).

EXAMPLE 7

In 475 wt. parts of the solvent recovered by the distillation from the reaction mixture in Example 6, 75 wt. parts of a crude copper phthalocyanine (purity 92%) was added and dissolved and in accordance with the process of Example 1, chlorine gas was charged under gradually elevating a temperature from room temperature to 100° C. and an opening degree of the control valve disposed at the outlet of the reactor was controlled so as to maintain the pressure to 3.0 Kg/cm$^2$ (gauge).

The color of the reaction mixture was changed from brawnish black to reddish color and chlorine was charged for 4 hours to change the color to carmine red. Total chlorine charged was 163 wt. parts.

In accordance with the process of Example 6, the distillation of the reaction mixture was carried out to recover 330 wt. parts of a solvent.

The bottom residue was washed with an acid and filtered and washed with an alkaline solution and filtered and washed with water and dried to obtain 133 wt. parts of a brilliant yellowish green crude chlorinated copper phthalocyanine. The product had 14.8 as average, of substituted chlorine atoms in the phthalocyanine molecule and had a purity of 96% and a yield was 98% (as theoretical value).

In accordance with the same process except using the recovered solvent of Example 6 and chlorosulfonic acid, sulfur and iodine corresponding to the lost ones, the chlorination was carried out to obtain the same result.

EXAMPLE 8:

In accordance with the process of Example 7 except changing the pressure of the reactor from 3.0 Kg/cm$^2$ (gauge) to 5.0 Kg/cm$^2$ (gauge), the chlorination was carried out to obtain 138 wt. parts of a brilliant yellowish green crude chlorinated copper phthalocyanine. The product had 15.3 as average, of substituted chlorine atoms in the phthalocyanine molecular and had a purity of 96% and a yield of 100% (as theoretical value).

EXAMPLE 9

In accordance with the process of Example 8 except changing the final temperature from 100° C. to 120° C., the chlorination was carried out to obtain 106 wt. parts of a brilliant yellowish green crude chlorinated copper phthalocyanine. The product had 15.8 as average, of substituted chlorine atoms in the phthalocyanine molecule and had a purity of 97% and a yield was 77% (as theoretical value).

EXAMPLE 10

In accordance with the process of Example 4 except using the recovered solvent and changing the pressure of the reactor to 5.0 Kg/cm$^2$ (gauge), the chlorination was carried out.

The reaction mixture was separated into two parts.

One part was used for the solvent-recovery process of Example 8 and the other part was used for the direct water-pouring process of Example 1 so as to obtain each crude chlorinated copper phthalocyanine.

In the case of the solvent recovery process, the resulting crude chlorinated copper phthalocyanine was in platy crystal having an average diameter of 10 to 30μ which was greenish black.

In the case of the direct water-pouring process, the resulting crude chlorinated copper phthalocyanine was a fine powder having particles of less than 0.01μ to about 30μ which was brilliant yellowish green. However, when each crude chlorinated copper phthalocyanine was pigmentized by a salt grinding method (U.S. Pat. No. 2,982,666), the pigment obtained by the solvent-recovery process had superior brilliant color.

The product of the chlorinated copper phthalocyanine had 15.0 as average, of substituted chlorine atoms in the phthalocyanine molecule and a purity of 96% and a yield was 98% (as theoretical value) in both cases.

REFERENCE 3

In accordance with the process of Example 2 except eliminating the charge of sulfur, the chlorination was carried out to obtain 90 parts of a yellowish green crude chlorinated copper phthalocyanine.

The product had 15.0 as average of substituted chlorine atoms in the phthalocyanine molecule and a purity of 96% and a yield was 66% (as theoretical value).

What is claimed is:

1. A process for producing a highly chlorinated copper phthalocyanine which comprises charging chlorine under an elevated pressure of 1 to 20 Kg/cm$^2$ (gauge) into a chlorosulfonic acid solution of a copper phthalocyanine which contains 7 to 200 wt.% of a catalyst of sulfur or sulfur chloride as sulfur (based on chlorosulfonic acid) to form pyrosulfuryl chloride under an elevated pressure of 1 to 20 Kg/cm$^2$ (gauge).

2. A process for producing a highly chlorinated copper phthalocyanine which comprises charging chlorine under an elevated pressure of 1 to 20 Kg/cm$^2$ (gauge) into a solution of a copper phthalocyanine in the presence of pyrosulfuryl chloride, chlorosulfonic acid and a catalyst of sulfur or sulfur chloride wherein the catalyst is present in an amount of 7 to 200 wt.% as sulfur (based on chlorosulfonic acid).

3. A process for producing a highly chlorinated copper phthalocyanine according to claim 1 or 2 wherein the pressure in the chlorination is in a range of 3 to 7 Kg/cm$^2$ (gauge).

4. A process for producing a highly chlorinated copper phthalocyanine according to claim 1 or 2 wherein the chlorination of a copper phthalocyanine is carried out in the presence of an auxiliary catalyst of iodine or iodine chloride or a metal chloride.

5. A process for producing a highly chlorinated copper phthalocyanine according to claim 1 or 2 or 5 wherein the pressure in the chlorination is in a range of 2 to 8 Kg/cm$^2$ (gauge).

6. A process for producing a highly chlorinated copper phthalocyanine according to claim 1 or 2 wherein the catalyst of sulfur or sulfur chloride is incorporated at a percent ratio of the catalyst as sulfur to chlorosulfonic acid of 8 to 100 wt.% so as to remain at least 2 wt.% of the catalyst as fulfur in pyrosulfuryl chloride.

7. A process for producing a highly chlorinated copper phthalocyanine according to claim 1 or 2 wherein the chlorination is carried out under charging chlorine and discharging hydrogen chloride gas so as to maintain an elevated pressure of 1 to 20 Kg/cm$^2$ (gauge).

8. A process for producing a highly chlorinated copper phthalocyanine according to claim 1 or 2 wherein the solvent formed by the chlorination is distilled and the resulting solvent is used as a solvent in the next chlorination with or without incorporating chlorosulfonic acid and the catalyst of sulfur or sulfur chloride or pyrosulfuryl chloride.

* * * * *